United States Patent [19]

Short

[11] Patent Number: 4,807,911

[45] Date of Patent: Feb. 28, 1989

[54] PUSH IN FITTING CONVERTER FOR PLASTIC TUBING

[76] Inventor: Charles D. Short, 145 Danbury Cir. North, Rochester, N.Y. 14618

[21] Appl. No.: 148,037

[22] Filed: Jan. 25, 1988

[51] Int. Cl.[4] .............................................. F16L 19/00
[52] U.S. Cl. .................................. 285/323; 285/342; 285/379; 285/921
[58] Field of Search ............... 285/323, 322, 379, 342, 285/921, 169, 12

[56] References Cited

U.S. PATENT DOCUMENTS

| | | | |
|---|---|---|---|
| 1,063,926 | 6/1913 | Schuermann | 285/342 |
| 1,202,506 | 10/1916 | Galloway | 285/12 X |
| 1,917,553 | 7/1933 | Scholtes | 285/379 X |
| 2,564,302 | 8/1951 | Fraser | 285/342 X |
| 3,563,575 | 2/1971 | Sanford | 285/323 |
| 3,909,046 | 9/1975 | Legris | 285/323 X |
| 4,138,145 | 2/1979 | Lawrence | 285/323 X |
| 4,407,526 | 10/1983 | Cicenas | 285/323 X |

*Primary Examiner*—Thomas F. Callaghan
*Attorney, Agent, or Firm*—Robert J. Bird

[57] ABSTRACT

Two embodiments of a push in tube fitting converter are disclosed. Each includes a nut, a tube gripping member such as a collet or ring, an O-ring, and a sealing retainer. In one embodiment, the interior of the nut includes a threaded portion at one end, a cylindrical seal seat, and a smaller diameter end cylindrical portion, with an internal shoulder between the threaded portion and the seal seat. The gripping member operatively engages the interior of the nut. The O-ring forms the seal between the seal seat of the nut, and tubing inserted through it. The sealing retainer is engaged by the internal threads of the nut to hold the sealing retainer, O-ring, and gripping member in place within the nut. The sealing retainer engages both the internal shoulder of the nut and a fitting body on which the nut is to be threaded, thereby forming the seal between nut and fitting body. The nut is thereby effective to make sealed connection with a fitting body, and to make gripping and sealed connection with tubing inserted into the nut.

In the second embodiment, the sealing retainer is threaded into the nut, and to the limits of the nut threads, to hold the sealing retainer, O-ring, and gripping member in place within the nut. The sealing retainer engages both the internal threads of the nut, and a fitting body on which the nut is to be threaded, thereby forming the seal between nut and fitting body. Again, the nut is effective to make sealed connection with a fitting body, and to make gripping and sealed connection with tubing inserted into the nut.

17 Claims, 2 Drawing Sheets

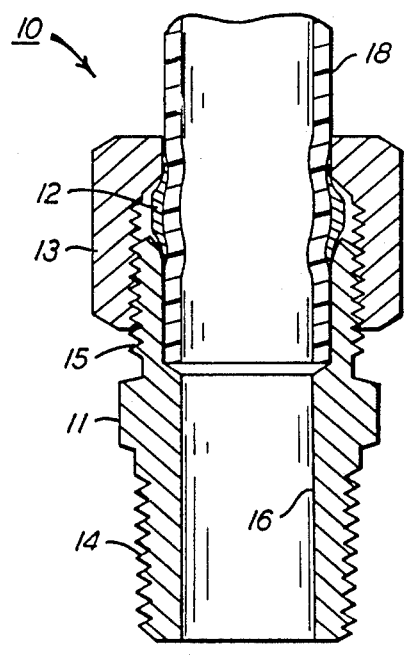
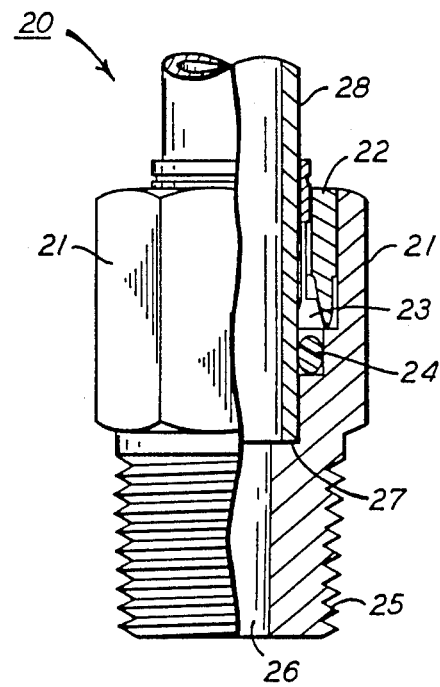
FIG. 1
(PRIOR ART)
FIG. 2
(PRIOR ART)
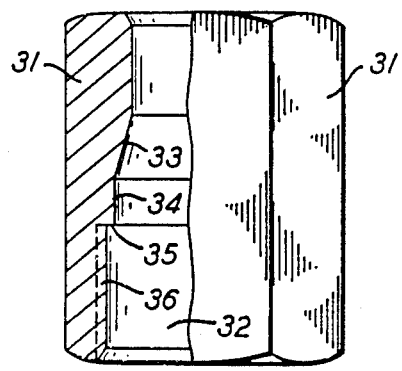
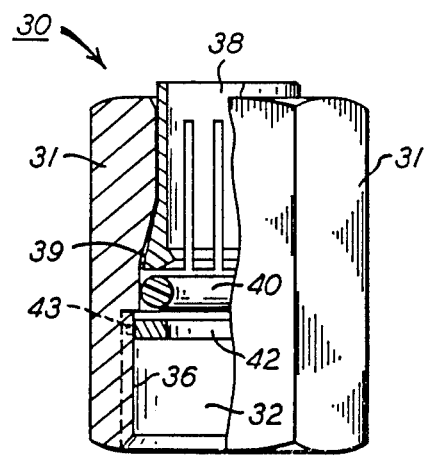
FIG. 3
FIG. 4

PUSH IN FITTING CONVERTER FOR PLASTIC TUBING

BACKGROUND OF THE INVENTION

This invention relates to a releasable "push in" tube fitting, for use primarily with plastic tubing. The invention permits the conversion of an existing installed prior art tube fitting into a time and cost saving "push in" type fitting for the plumbing of plastic tubing.

At the present time, "push in" fittings are available only as complete units. If it is desired to convert an existing tubing system from conventional compression type fittings to push in type fittings, the existing compression fittings are of no value to the conversion, and must be entirely removed. By means of the present invention, an existing in-place compression fitting body (the part which is threaded into some body of hardware) can be kept in place as part of a conversion to a push in fitting.

Typical tubing lines for the transmission of fluids may include various sizes and shapes of pieces, generally identified as "fittings", to make connections between successive portions of tubing, or between tubing and other hardware. Such fittings include male connectors, male elbows, male branch tees, male run tees, and others. The size range is quite extensive, as it relates both to outside diameters of mating tubing and to thread sizes.

A conventional compression fitting includes a body, a nut, and a sleeve. The body usually has male or female pipe threads at one end, and straight male threads at the other end. The nut is threaded onto the straight male threads. The sleeve fits between the nut and the body. An end of tubing is inserted through the nut and sleeve. Sleeve and tubing are compressed by the action of the nut and body, as they are threaded together, to form a tight sealed connection of fitting and tubing.

SUMMARY OF THE INVENTION

In summary, the present invention is a "push in" tube fitting converter. It includes two embodiments, each including a nut, a tube gripping member such as a collet or ring, an O-ring, and a sealing retainer. In one embodiment, the interior of the nut includes a threaded portion at one end, a cylindrical seal seat, and a smaller diameter end cylindrical portion, with an internal shoulder between the threaded portion and the seal seat. The gripping member operatively engages the interior of the nut. The O-ring forms the seal between the seal seat of the nut, and tubing inserted through it. The sealing retainer is engaged by the internal threads of the nut to hold the sealing retainer, O-ring, and gripping member in place within the nut. The sealing retainer engages both the internal shoulder of the nut and a fitting body on which the nut is to be threaded, thereby forming the seal between nut and fitting body. The nut is thereby effective to make sealed connection with a fitting body, and to make gripping and sealed connection with tubing inserted into the nut.

In the second embodiment, the sealing retainer is threaded into the nut, and to the limits of the nut threads, to hold the sealing retainer, O-ring, and gripping member in place within the nut. The sealing retainer engages both the internal threads of the nut, and a fitting body on which the nut is to be threaded, thereby forming the seal between nut and fitting body. Again, the nut is effective to make sealed connection with a fitting body, and to make gripping and sealed connection with tubing inserted into the nut.

BRIEF DESCRIPTION OF THE DRAWINGS

FIG. 1 is a sectional view of a compression tube fitting of the prior art.

FIG. 2 is a sectional view of a push-in tube fitting of the prior art.

FIG. 3 is a sectional view of the nut portion of a tube fitting converter according to this invention.

FIG. 4 is a sectional view of a complete tube fitting converter according to this invention.

DESCRIPTION

Figure 5:
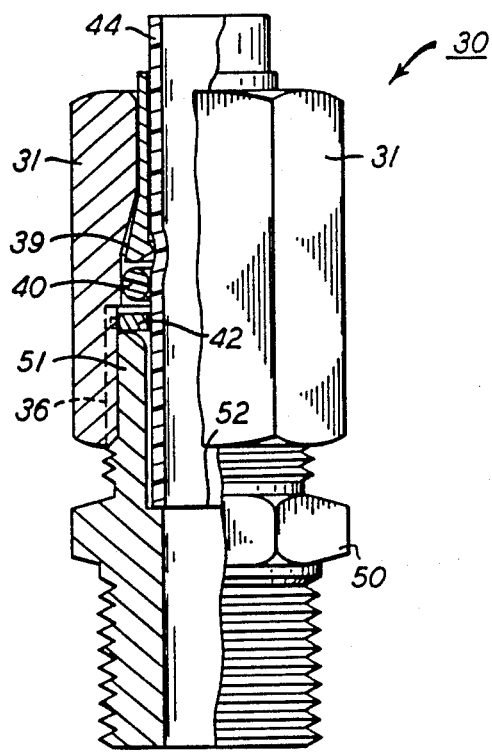
FIG. 5 is a sectional view of the converter of FIG. 4, shown in operative connection to a mating fitting body and to plastic tubing.
Figure 6:
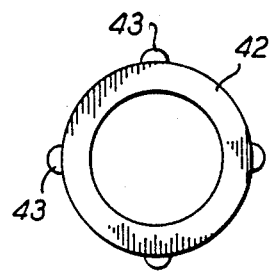
FIG. 6 is an end view of a sealing retainer which is part of the assembly shown in FIG. 4.

As an aid to understanding the present invention, it will be helpful to consider it in a typical environment. As a starting point, consider a typical prior art fitting used to couple tubing to an air cylinder. In FIG. 1, a prior art compression fitting 10 includes a body 11, sleeve 12, and nut 13. The body 11 of the fitting has tapered male pipe threads 14 on one end and straight male threads 15 on the other end, and includes a central through passage 16. Starting from a disassembled condition, the pipe threads 14 of the body 11 are threaded into mating female pipe threads in the body of an air cylinder (not shown). Nut 13 is slipped over one end of a section of tubing 18. Sleeve 12, a generally hollow cylindrical member and somewhat tapered at its exterior ends, is next slipped over the end of tubing 18. Tube 18 is inserted into the passage 16. Nut 13 and sleeve 12 are together moved along the tubing into engagement with the body 11. The nut 13 is tightened on body threads 15, compressing the sleeve 12 into a sealing engagement with the inner periphery of the central passage 16 of body 11 and with the outer periphery of tubing 18, as shown in FIG. 1. The tubing 18 is thus operatively connected to the air cylinder.

Should it become necessary to disconnect the tubing from the air cylinder, the nut 13 must be unthreaded, and the tubing 18 and sleeve 12 removed as a unit because the original compression of the sleeve onto the tubing caused a mechanical bonding of tubing and sleeve. To reconnect the tubing with the fitting on the cylinder, the deformed sleeve and a portion of tubing must be cut off and discarded. A new sleeve must be used to connect the now shorter tubing to the original fitting body, as described above.

This obviously is a time consuming and wasteful process. Time is required for the manual steps involved in tightening, loosening, cutting, and dressing of cut tubing. Waste is involved in the loss of a portion of tubing. Indeed, where the length of tubing is critical, the entire original piece may be lost.

Later technology has developed "push in" fittings which will receive tubing which is simply pushed into the fitting. Push in fittings area generally threaded on one end for connection to other bodies or hardware, such as the air cylinder, in the same way as the compression type fitting. Push in fittings are direct replacements for compression type fittings, especially for use with plastic tubing.

U.S. Pat. No. 3,653,689 issued Apr. 4, 1972 to Sapy et al is the closest relevant prior art. FIG. 2 herein is a cross section of a push-in tube fitting 20 according to Sapy et al. It includes a body 21 with a tapered collar 22, a slotted resilient gripping collet 23, and O-ring 24 all within the body. The body 21 of the fitting has tapered male pipe threads 25 on one end and includes a central through passage 26. Gripping collet 23 includes an outer peripheral taper for operative engagement with the tapered inner surface of collar 22. O-ring 24 surrounds passage 26 within the body 21, between the collet 23 and an abutment shoulder 27 within the body 21. Tube 28 is pushed into the fitting through passage 26, through the gripping collet 23 and O-ring 24, and against the abutment shoulder 27. The gripping collet 23 takes hold of the outer periphery of the tubing. The O-ring 24, which is in tension around the tube 28 and in compression within the fitting passage 26, forms a seal between tube and fitting. Any tube pullout force acts to tighten the grip of the gripping collet on the tube.

At the present time, fittings as disclosed by Sapy et al, and all other commercially available push in fittings are constructed, sold, and used each as a discrete unitary whole. Body, gripping mechanism, and sealing device are permanently combined. They are not user serviceable or disassemblable in the field.

Unlike the prior art push in fitting of FIG. 2, the present invention is not a complete fitting but only a portion of a fitting. It cannot by itself perform as a fitting, but requires another component to make a whole. This invention is in essence an converter for an existing compression fitting, enabling a user to convert the same to a push in fitting. Conversion is simple. The existing fitting body is left in place, and the existing nut and sleeve are removed and replaced by the converter of this invention which takes the form of a female threaded nut. The fitting thus converted is now ready to receive plastic tubing, pushed in in the manner described in connection with FIG. 2.

The fitting converter 30 of this invention is shown in FIGS. 3-6. Converter 30 includes a nut 31 (FIG. 3) having a central through passage 32. Passage 32 is configured along its length to include a tapered portion 33, a straight cylindrical land or seal seat 34, an internal shoulder or stop 35, and internal threads 36 of diameter larger than the seal seat 34. In FIGURE 4, a slotted resilient gripping collet 38, an annular sealing member or O-ring 40, and an annular sealing retainer or washer 42, are mounted in axial alignment within the nut 31. Gripping collet 38 includes an outer peripheral taper 39 for operative engagement with the tapered inner surface 33 of the nut. O-ring 40 presses outwardly against the wall of passage 32. Sealing retainer 42 (FIG. 6) includes a number of radial retaining lips 43 spaced around its circumference for engagement with the internal threads 36 of the nut 31 to hold the retainer 42, O-ring 40, and gripping collet 38 in place within the nut.

In FIG. 5, nut 31 is threaded onto a fitting body 50 similar to the body 11 of the compression fitting in FIG. 1. Nut 31 is threaded onto the body 50 until the end 51 of body 50 presses the sealing retainer 42 against the internal shoulder 35 of nut 31, forming a seal between body 50 and nut 31. A tube 44 is pushed into the fitting converter 30 from above, through the gripping collet 38, O-ring 40, and sealing retainer 42 until reaching a stop or shoulder 52 within the mating fitting body 50. The gripping collet 38 takes hold of the outer periphery of the tubing. The O-ring 40, which is in tension around the tube 44 and in compression within the seat 34 of nut 31, forms a seal between tube 44 and nut 31. Any tube pullout force acts to tighten the grip of the gripping collet on the tube.

The sealing retainer 42 is multi-purposed. It is a retaining ring for the O-ring 40 and collet 38, and it forms the seal between the converter nut 31 and the body 50 on which it is threaded. Sealing retainer 42 abuts the internal shoulder or stop 35 of the nut 31 to limit the axial travel of the nut 31 onto the body 50. Thus, the O-ring 40 is not axially compressed, deformed, or gripped between retainer 42 and collet 38, but self positioning on the cylindrical land or seal seat 34.

In the event that the fitting body, to which the converter of this invention is to be connected, is of a type having reduced external threads, then the internal threads 36 of the converter nut 31 can be reduced by a threaded bushing to fit the reduced external threads of the fitting body. By this means, the converter of this invention will function with a variety of existing compression fitting bodies.

Figure 7:
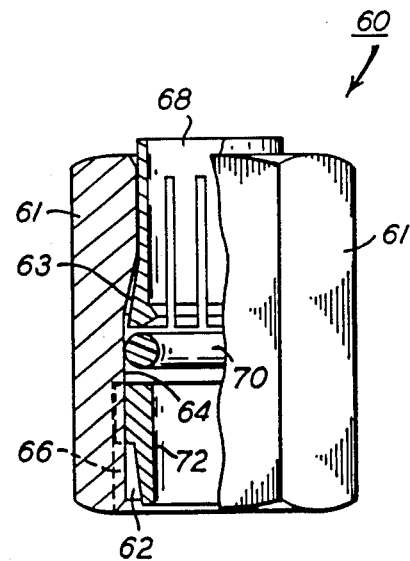
FIG. 7 is a sectional view of a complete tube fitting converter according to a modified embodiment of this invention.
Figure 8:
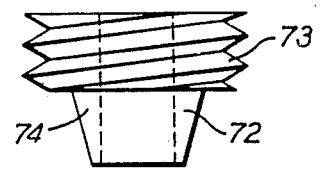
FIG. 8 is an elevation view of a sealing retainer from the modified form of this invention shown in FIG. 7.

A preferred solution, however, where the fitting body has reduced external threads, is the fitting converter 60 shown in FIGS. 7 and 8. Converter 60 includes a nut 61 having a central through passage 62. Passage 62 includes a tapered portion 63 and a straight cylindrical portion. The straight portion includes a cylindrical land or seal seat 64 along part of its length, and internal threads 66 of the same inside diameter along the rest of its length. Unlike the converter 30 described earlier, nut 61 does not include an internal shoulder or stop (such as 35 in FIG. 3). A tapered gripping collet 68 for coaction with taper 63, and an annular sealing member or O-ring 70 for sealing engagement around tubing and within the wall of passage 62, are similar to corresponding elements in the converter 30. An annular sealing retainer 72 of resilient material, shown also in FIG. 8, includes male threads 73 and a tapered axial extension 74. Threads 73 engage the internal threads 66 of the nut 61 to hold the retainer 72 itself, and O-ring 70 and gripping collet 68 in place within the nut.

When the converter 60 is threaded on a fitting body 50 (such as in FIG. 5) the tapered axial extension 74 of the sealing retainer 72 is pressed into sealing engagement within the end 51 of the body 50, and the threads 73 of the retainer are pressed into sealing engagement with the internal threads 66, thus forming the necessary seal between body 50 and nut 61. A tube (such as 44 in FIG. 5) is pushed into the fitting converter 60 from above, through the gripping collet 68, O-ring 70, and sealing retainer 72 until reaching a stop within the mating fitting body 50. The gripping collet 68 takes hold of the outer periphery of the tubing. The O-ring 70, which is in tension around the tube and in compression within the seat 64 of nut 61, forms a seal between the tube and nut 61. Any tube pullout force acts to tighten the grip of the gripping collet on the tube.

The sealing retainer 72 of converter 60 is also multipurposed. It is a retaining ring for the O-ring 70 and collet 68, and it forms the seal between the converter nut 61 and the body 50 on which it is threaded. Sealing retainer 72 is threaded into the nut 31 to the limit of threads 66, leaving axial space for the O-ring 70. Thus, the O-ring 70 is not axially compressed, deformed, or gripped between retainer 72 and collet 68, but self positioning on the cylindrical land or seal seat 64.

The inner parts of the fitting converters 30 and 60 of this invention are accessible because their sealing retainers 42 and 72, respectively, make the converters user-serviceable. This is a distinct advantage over the prior art push in fitting of FIG. 2, the interior parts of which are not accessible for replacement.

It will be readily appreciated that the converters 30 and 60 of this invention are simpler and less costly to produce than a prior art push in fitting 20, there being fewer parts and less material. In addition, the converters are less costly to use, partly because of the immediate economy realized by attaching to existing in-place hardware, and partly because the converters are serviceable. Consummable or wearable components can be replaced. Furthermore, the O-rings and sealing retainers of these converters are easily removable and replaceable by O-rings and retainers of other materials, in the event the system is to be used for conveying a gas or fluid which is hostile to the existing O-ring and retainer. The converters of this invention enable a user to convert an existing compression fitting into a push in fitting at a fraction of the cost of a prior art push in fitting.

Throughout this specification, the invention has been described in connection with a tapered gripping collet as part of the combination. It is to be understood that other tube gripping means are also suitable for use as part of this invention, and it is clearly intended that that they be used. A "star washer" configuration, being a ring with inwardly extending gripping fingers, is one example of such a gripping mechanism.

The foregoing specification describes the concept of this invention and the presently preferred embodiments for practising the same. The scope of the invention is limited only by the following claims.

What is claimed is:

1. A push in tube fitting converter for threaded attachment to a tube fitting body, including:
   a nut defining a central through passage including an internal threaded portion at one end, a cylindrical seal seat portion of diameter smaller than that of said threaded portion, and a cylindrical tube end portion of diameter smaller than that of said seal seat portion, said threaded portion and said seal seat portion together defining an internal shoulder;
   gripping means disposed within said passage for gripping engagement with tubing inserted therethrough;
   an annular sealing member in sealing engagement around the inner periphery of said cylindrical seal seat portion of said passage, and adapted for sealing engagement with tubing inserted therethrough to form a seal between said tubing and said nut; and
   an annular sealing retainer disposed within said internal threaded portion of said passage and engaged by threads thereof to hold said sealing retainer, said sealing member, and said gripping means in place within said nut, said sealing retainer adapted for sealing engagement on one side thereof with said internal shoulder and on the other side thereof with said fitting body to form a seal between said nut and said fitting body.

2. A push in tube fitting converter as defined in claim 1 in which said gripping means includes a ring having inwardly extending gripping fingers.

3. A push in tube fitting converter as defined in claim 1 in which said internal shoulder limits the axial travel of said fitting body and said sealing retainer relative to said nut to prevent interference with said O-ring.

4. A push in tube fitting converter as defined in claim 1 in which said sealing retainer further includes a plurality of radial retaining lips spaced around the circumference thereof for engagement with said internal threads of said nut.

5. A push in tube fitting converter for threaded attachment to a tube fitting body, including:
   a nut defining a central through passage including an internal threaded portion at one end, a cylindrical seal seat portion of diameter smaller than that of said threaded portion, and a cylindrical tube end portion of diameter smaller than that of said seal seat portion, said threaded portion and said seal seat portion together defining an internal shoulder;
   gripping means disposed within said passage for gripping engagement with tubing inserted therethrough;
   an O-ring in sealing engagement around the inner periphery of said cylindrical seal seat portion of said passage, and adapted for sealing engagement with tubing inserted therethrough to form a seal between said tubing and said nut; and
   an annular elastomeric washer disposed within said internal threaded portion of said passage and engaged by threads thereof to hold said washer, said O-ring, and said gripping means in place within said nut, said washer adapted for sealing engagement on one side thereof with said internal shoulder and on the other side thereof with said fitting body to form a seal between said nut and said fitting body;
   whereby said nut is adapted to make sealed connection with said fitting body, and to make gripping and sealed connection with tubing inserted into said nut.

6. A push in tube fitting converter as defined in claim 5 in which said gripping means includes a ring having inwardly extending gripping fingers.

7. A push in tube fitting converter as defined in claim 5 in which said internal shoulder limits the axial travel of said fitting body and said washer relative to said nut to prevent interference with said O-ring.

8. A push in tube fitting converter as defined in claim 5 in which said washer further includes a plurality of radial retaining lips spaced around the circumference thereof for engagement with said internal threads of said nut.

9. A push in tube fitting converter for threaded attachment to a tube fitting body, including
   a nut defining a central through passage including an internal threaded portion at one end, a cylindrical seal seat portion, and a cylindrical tube end portion of diameter smaller than that of said seal seat portion;
   gripping means disposed within said passage for gripping engagement with tubing inserted therethrough;
   an annular sealing member in sealing engagement around the inner periphery of said cylindrical seal seat portion of said passage, and adapted for sealing engagement with tubing inserted therethrough to form a seal between said tubing and said nut; and
   an annular sealing retainer threaded within said internal threaded portion of said passage to hold said sealing retainer, said sealing member, and said gripping means in place within said nut, said sealing retainer adapted for sealing engagement with the internal threads of said nut and with said fitting body to form a seal between said nut and said fitting body.

10. A push in tube fitting converter as defined in claim 9 in which said gripping means includes a ring having inwardly extending gripping fingers.

11. A push in tube fitting converter as defined in claim 9 in which said internal threaded portion limits the axial travel of said fitting body and said sealing retainer relative to said nut to prevent interference with said O-ring.

12. A push in tube fitting converter as defined in claim 9 in which said sealing retainer includes a tapered axial extension for sealing engagement, around the outer periphery thereof, within said fitting body.

13. A push in tube fitting converter for threaded attachment to a tube fitting body, including:
  a nut defining a central through passage including, disposed in series along the axis thereof, an internal threaded portion at one end, a cylindrical seal seat portion of diameter smaller than that of said threaded portion, a tapered portion, and a cylindrical tube end portion of diameter smaller than that of said seal seat portion, said threaded portion and said seal seat portion together defining an internal shoulder;
  a tapered gripping collet disposed in said central passage in operative engagement with the tapered portion thereof;
  an annular sealing member in sealing engagement around the inner periphery of said cylindrical seal seat portion of said passage, and adapted for sealing engagement with tubing inserted therethrough to form a seal between said tubing and said nut; and
  an annular sealing retainer disposed within said internal threaded portion of said passage and engaged by threads thereof to hold said sealing retainer, said sealing member, and said gripping collet in place within said nut, said sealing retainer adapted for sealing engagement on one side thereof with said internal shoulder and on the other side thereof with said fitting body to form a seal between said nut and said fitting body.

14. A push in tube fitting converter for threaded attachment to a tube fitting body, including:
  a nut defining a central through passage including, disposed in series along the axis thereof, an internal threaded portion at one end, a cylindrical seal seat portion of diameter smaller than that of said threaded portion, a tapered portion, and a cylindrical tube end portion of diameter smaller than that of said seal seat portion, said threaded portion and said seal seat portion together defining an internal shoulder;
  a tapered gripping collet disposed in said central passage in operative engagement with the tapered portion thereof;
  an O-ring in sealing engagement around the inner periphery of said cylindrical seal seat portion of said passage, and adapted for sealing engagement with tubing inserted therethrough to form a seal between said tubing and said nut; and
  an annular elastomeric washer disposed within said internal threaded portion of said passage and engaged by threads thereof to hold said washer, said O-ring, and said gripping collet in place within said nut, said washer adapted for sealing engagement on one side thereof with said internal shoulder and on the other side thereof with said fitting body to form a seal between said nut and said fitting body;
  whereby said nut is adapted to make sealed connection with said fitting body, and to make gripping and sealed connection with tubing inserted into said nut.

15. A push in tube fitting converter for threaded attachment to a tube fitting body, including
  a nut defining a central through passage including, disposed in series along the axis thereof, an internal threaded portion at one end, a cylindrical seal seat portion, a tapered portion, and a cylindrical tube end portion of diameter smaller than that of said seal seat portion;
  a tapered gripping collet disposed in said central passage in operative engagement with the tapered portion thereof;
  an annular sealing member in sealing engagement around the inner periphery of said cylindrical seal seat portion of said passage, and adapted for sealing engagement with tubing inserted therethrough to form a seal between said tubing and said nut; and
  an annular sealing retainer threaded within said internal threaded portion of said passage to hold said sealing retainer, said sealing member, and said gripping collet in place within said nut, said sealing retainer adapted for sealing engagement with the internal threads of said nut and with said fitting body to form a seal between said nut and said fitting body.

16. A push in tube fitting converter as defined in claim 15 in which said internal threaded portion limits the axial travel of said fitting body and said sealing retainer relative to said nut to prevent interference with said O-ring.

17. A push in tube fitting converter as defined in claim 15 in which said sealing retainer includes a tapered axial extension for sealing engagement, around the outer periphery thereof, within said fitting body.

* * * * *